(12) United States Patent
Attwood et al.

(10) Patent No.: US 8,324,306 B2
(45) Date of Patent: Dec. 4, 2012

(54) EQUESTRIAN SURFACING MATERIALS

(75) Inventors: Nicholas Attwood, Las Vegas, NV (US); Edwin J. Barron, Baltimore, MD (US)

(73) Assignee: Equestrian Surfaces, Inc., Middleburg, VA (US)

( * ) Notice: Subject to any disclaimer, the term of this patent is extended or adjusted under 35 U.S.C. 154(b) by 767 days.

(21) Appl. No.: 12/257,259

(22) Filed: Oct. 23, 2008

(65) Prior Publication Data

US 2009/0163623 A1 Jun. 25, 2009

Related U.S. Application Data

(60) Provisional application No. 60/982,034, filed on Oct. 23, 2007.

(51) Int. Cl.
| | |
|---|---|
| *B60C 1/00* | (2006.01) |
| *C08K 3/34* | (2006.01) |
| *B32B 5/16* | (2006.01) |
| *B32B 9/00* | (2006.01) |
| *B32B 15/02* | (2006.01) |
| *B32B 17/02* | (2006.01) |
| *B32B 19/00* | (2006.01) |
| *B32B 21/02* | (2006.01) |
| *B32B 23/02* | (2006.01) |
| *B32B 27/02* | (2006.01) |

(52) U.S. Cl. .......................... 524/492; 428/404; 428/407
(58) Field of Classification Search .................. 524/492; 428/404, 407
See application file for complete search history.

(56) References Cited

U.S. PATENT DOCUMENTS

| | | | | |
|---|---|---|---|---|
| 4,819,933 | A | * | 4/1989 | Armond .......................... 472/92 |
| 5,088,724 | A | * | 2/1992 | Hawkins et al. ................ 472/92 |
| 5,961,389 | A | * | 10/1999 | Dickinson ....................... 472/92 |

* cited by examiner

*Primary Examiner* — Liam Heincer
*Assistant Examiner* — Angela C Scott
(74) *Attorney, Agent, or Firm* — Capitol City TechLaw PLLC

(57) ABSTRACT

Disclosed are surfacing materials formed from a suitable angular or sub-angular base sand mixture that is coated with a polymer or polymer/oil blend and then combined with short fibers to produce the final surfacing composition. The polymers and polymer/oil blends are selected to reduce temperature dependent viscosity variations in the surfacing materials, thereby providing a more consistent "going" for horses or other livestock being worked on these surfacing materials. Also disclosed are methods of manufacturing such surfacing compositions and methods of using such surfacing compositions in constructing riding venues including, for example, arenas and tracks.

13 Claims, 7 Drawing Sheets

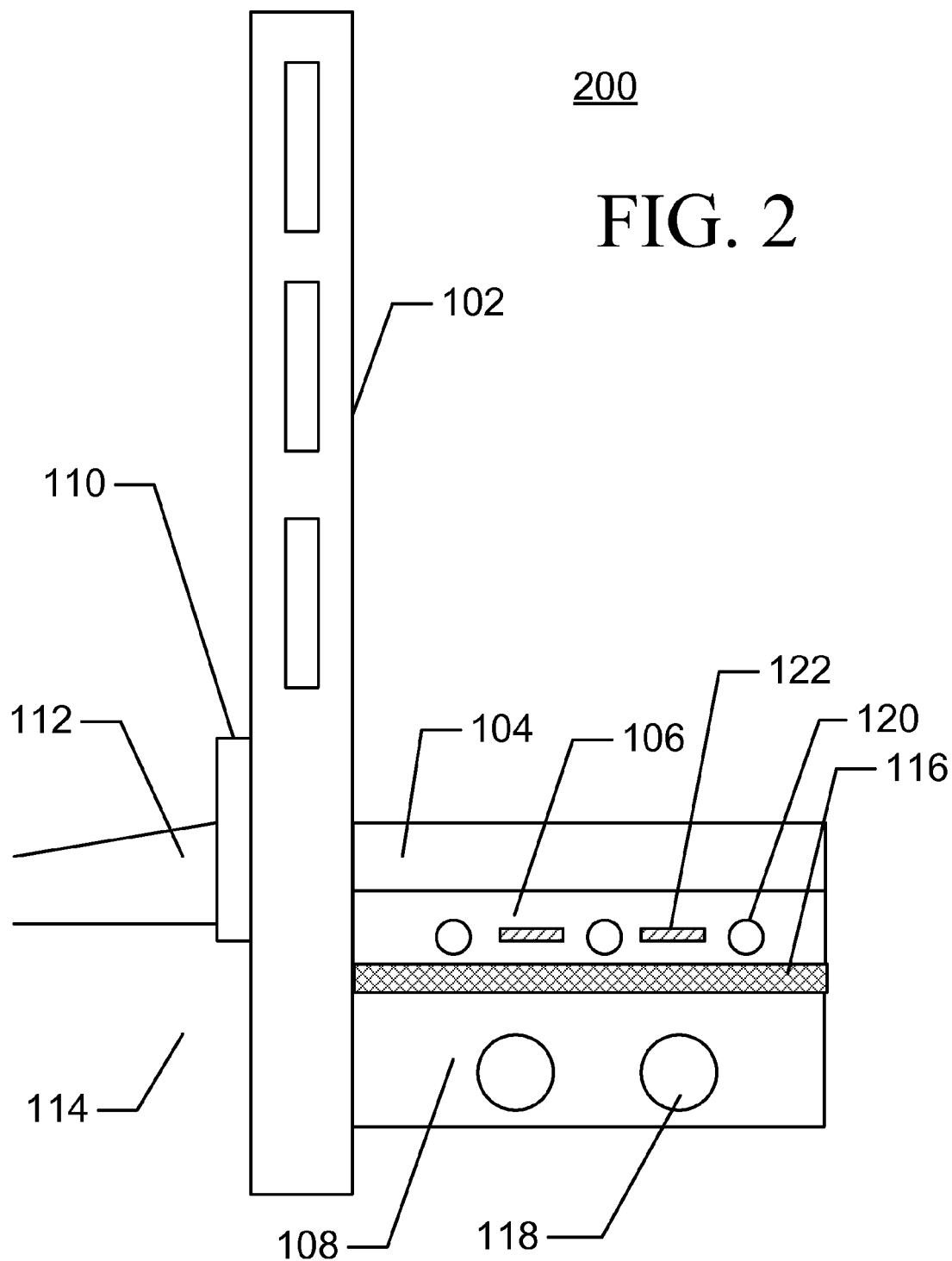

EQUESTRIAN SURFACING MATERIALS

BACKGROUND

1. Field of Endeavor

The disclosure relates to the formulation, manufacture and use of surfacing materials that provide increased compliance and rebound in order to reduce the likelihood of injury to riders and their mounts during equestrian activities. It is anticipated that these equestrian surfacing materials will be particularly useful as a ground cover/flooring for a wide range of equestrian activities and sports, particularly as applied to horse training and race tracks, riding arenas, round pens and walkers. It is further anticipated that these equestrian surfacing materials would be suitable for use during training, thoroughbred racing, show jumping, dressage, English pleasure riding and western pleasure riding.

2. Discussion of Conventional Art

At present, there are no universal recommendations for the perfect arena surfacing or surfacing material but the general goals include providing a surface that provides cushioning to reduce concussion on horse legs and reduce the chance of injuries during a fall, that is firm enough to provide adequate traction, that does not generate much dust, that is not unduly abrasive or damaging to a horse's hooves, that maintains an acceptable combination of properties over a wide temperature range from the coldest winter mornings to the hottest summer days, provides good value and that does not require excessive maintenance. As will be appreciated, the cost of surfacing materials varies widely as a function of the various components, the local availability of some or all of the components as well as the expenses associated with manufacture, transportation and installation. The intended primary use(s) of the arena for dressage, jumping, reining or driving, for example, will also influence the selection of the surfacing material and other parameters including, for example, as traction and depth of loose material.

A variety of manufactured materials that depend less on local availability and tend to provide more uniform properties are available for installation. A range of naturally occurring or processed inorganic materials including, for example, sand, stone dust and gravel, are typically available from local or regional quarries. In many instances, these materials may be specified with regard to one or more defined characteristics including, for example, particle size, particle size distribution, particle shape and particle angularity.

Among the factors that complicate efforts to arrive at a national "target" surfacing material are the local and regional variations in the component materials, the range of temperature to which the surfacing material will be exposed, and the amount of moisture to which the material will be exposed. As noted above, however, with respect to quarried inorganic materials (for example, sand, stone dust and/or gravel), the purchaser typically has the benefit of standard industrial nomenclature that provides information relating to particle sizes and the distribution of sizes found in a particular quarried product. Particle size distribution is determined by shaking the material through a set of sieves that have increasingly smaller holes in order to separate the finer material from the progressively larger materials retained by the upper sieves.

As will also be appreciated by those skilled in the art, surfacing materials are rather dynamic and will be expected to experience some compositional and property changes with time and use. For example, arena surfacing materials are expected to accumulate manure and urine over the years use and need to be formulated and/or maintained in a way that continues to provide an acceptable combination of surfacing material properties. The surfacing materials will also be subjected to the impact of horse's hooves and, not uncommonly, cattle, maintenance vehicles and, in some instances, other vehicles as well. If the surfacing materials are not sufficiently robust, these mechanical forces can break down the surfacing material components, thereby increasing the percentage of "fines" and, consequently, increasing the likelihood of increased dust generation and/or surface compaction. In some cases, as the older material breaks down or becomes contaminated, the surfacing material may be refreshed through the addition of fresh material(s) intended to improve or renew the performance of the surfacing material.

As noted above, the primary goal in selecting surfacing materials is to provide a surface that maintains its generally loose nature while simultaneously providing a degree of stability and traction sufficient for the intended riding and/or driving activities. As known to those skilled in the art, a major component of most surfacing compositions is a mixture of inorganic sand(s), silt(s) and/or clay(s) particles. In addition to the inorganics, a range of organic bulk materials, whether original and/or added during use as in the case of horse manure) and may also include additives such as coatings, fibers and/or pieces of rubber.

A number of these products are currently available in the market and are sold under a variety of names including, for example, POLYTRACK™, TAPETA™ and CUSHION TRACK.™ However, these surfacing products tend to become both very firm at lower temperatures for example, $-10°$ C. to $5°$ C., and become very soft and/or sticky at temperatures above $30°$ C. This temperature dependence of the properties of these surfacing materials is generally attributed to the large changes in the viscosity of the wax(es) incorporated in these formulations over this temperature range.

These changes in the viscosity and nature of the conventional manufactured surfacing products can cause the "going," i.e., the performance of the surface as experienced by the horses and/or riders, to change dramatically over the course of a season, a day, or even simultaneously across shaded and exposed portions of a single track or arena. These changes in "going" can, in turn, result in detrimental effects on the performance, confidence and/or health of the horses. For example, at lower temperatures these surfaces will generally become too firm reduce the degree of cushioning provided to the horses legs. Conversely, at elevated temperatures these surfaces will generally exhibit reduced structural strength, increased softness and reduced traction.

It is well established in the equestrian world that surfaces which are either too firm or too soft can increase the likelihood of serious injury to the horse and/or reduce the horse's confidence and increase the likelihood of injury to a rider or jockey, particularly in those activities that involve jumping or rapid changes in direction. Further, efforts to compensate for these changes in properties of the surfacing materials over this conventional temperature range also increase the complexity and expense of maintaining such surfaces.

Sand is a common ingredient in many arena surfaces and is typically used in particle size ranges from fine sand (about 0.05 mm average diameter) to coarse sand (about 2.00 mm average diameter). Although sand can be used as the sole surfacing material, it is often combined other particle sizes or other materials to improve its stability and traction. It has been found that the loose traction resulting from thicker layers of sand, for example, a sand depth of more than about 10 cm, may result in undue stress to a horse's tendons. Further, although newly laid sand will contain air pockets that will temporarily improve its ability absorb shock and provide some rebound effect, given its mechanical strength and mineral nature, sand will tend to compact into a less suitable surface over time and/or with heavy use.

Because sand drains well and tends to dry quickly, it can produce unwanted dust unless sufficient moisture is retained in the upper portion of the surfacing material. This moisture may be provided through periodic watering, whether automatic or manual, if the rainfall is insufficient or the surface is protected. As noted above, other materials may be combined with sand to improve its ability to retain moisture including organic products including, for example, sawdust, mulch or other wood or vegetation based material, or commercial additives in the form of coatings or particles that will retain moisture and release it more slowly, thereby decreasing the need for frequent watering.

Those of skill in the art will also appreciate that all sand is not created equal. Sand used in surfacing materials should typically be cleaned (washed to remove silt and clay) and screened (passed through a series of mesh plates to separate the sand particles by size) to remove fines to obtain a sand mixture comprising medium to coarse particles of hard, sharp sand. Fines should be removed because they tend to break down further during use to form dust particles the associated issues. As used herein, "hard" or angular sand consists primarily of quarried quartz particles characterized by sharp edges and faces that stand in marked contrast to the rounded sand particles recovered from riparian sources on which the sharp edges have been reduced through abrasion.

Although "sand" is frequently one of the most widely and readily available surfacing materials, the hard, angular, washed sands that are more suitable for forming surfacing materials are among the most expensive sands. As noted above, cleaned, washed sand alone, particularly at depths of more than about 10 cm, will generally be too loose for those riding disciplines and events that incorporate sharp turns and stops, such as barrel racing and cutting. And while wetting the sand can improve the traction, the frequent and abundant watering that may be needed to maintain the sand in the appropriate moisture range may not be economically and/or technically realistic in some locations.

Combination sand-soil surfacing materials are typically more popular than pure sand for western riding events, particularly those in which improved stability is needed for speed events can be provided with a more compacted condition or, alternatively, processed or harrowed to increase the looseness of the mixture and render it more suitable for sliding stops, such as those commonly seen in roping events and cutting work. In addition to soil, other materials including, for example, wood and/or rubber particles, may be mixed with sand to overcome some of the performance shortcomings associated with sand alone. The addition of wood products will typically improve the moisture retaining capacity of the mixture, improve the traction of the mixture and add some cushioning effects. As would be expected, the addition of rubber particles including, for example, post-consumer granulated rubbers, tends to improve the cushioning properties of a sand surfacing mixture and can prolong the useful life of the surfacing material by decreasing sand-to-sand abrasion.

As noted above, wood products may be used in combination with other materials such as sand or may be used as the sole or primary footing material. Wood chips or coarse sawdust will tend to improve the cushioning and moisture-holding capacity of inorganic materials, (sand, stone dust). Wood products are, however, can vary quite widely from location to location and even from load to load from the same wood mill. In addition, wood products are not as durable as sand and will eventually breakdown and/or decompose. This degradation will typically become a problem sooner in those wood products that have a smaller initial particle size and/or are manufactured from softer woods tend to be more prone to break down into smaller particles that will eventually lead to compacted footing and/or dust generation. Some concerns have also been raised regarding the emission of volatile organic compounds (VOCs) from some of the softer woods like pine and cedar and the connection to respiratory issues. It is also recommended that walnut and cherry be excluded as sources for the wood products as they are highly toxic to horses. An advantage of predominately wood based surfacing materials is the reduced abrasiveness on horse hooves when compared with sand-based and/or stone dust-based surfacing materials. As with sand-based materials, however, in most instances a certain range of moisture needs to be maintained within the wood product to provide suitable traction. When the wood products are allowed to become either too dry or too wet the traction tends to decrease and may result in slips, falls and refusals.

As discussed above, rubber materials from, for example, recycled shoes or tires can be ground or shredded into small particles. It is particularly important that rubber from recycled tires be processed to remove any residual metal fibers (from steel-belted tires) or other foreign materials. Unlike wood products, rubber-based surfacing materials tend to decompose or break down more slowly. It is to be expected, however, that there will be some degradation simply as a result of the action of the horses' hooves in grinding the rubber products against more abrasive materials including, for example, sand and/or stone dust. The dark color of most recycled rubber may reduce glare and improve the solar heating of the surfacing materials during cold periods and speed thawing. Depending on the rubber source, rubber particles may have a specific gravity of about 1.0 or less that may cause them to float or otherwise segregate when the surfacing material is flooded, whether deliberately or during heavy rainfall events. Accordingly, provisions should be made for periodically processing the surfacing material to redistribute the rubber particles throughout the surfacing material layer.

As indicated above, stone dust is another conventional surfacing material that can provide good stability, good drainage and an attractive surface when properly maintained, typically including watering and harrowing. Although properly maintained stone dust can provide suitable footing for equestrian events, it tends to be very subject to both compaction and dust generation. If used as a primary component of a surfacing material, stone dust (also known by various regional names including, for example, blue stone, rock dust, limestone screenings, decomposed granite and white stone) should be classified (screened) to contain a narrow range of grade sizes that will be less subject to compaction. As suggested above, mixing stone dust with rubber will reduce its tendency toward compaction while preserving acceptable stability that allows for quick changes in direction and speeds during equestrian events such as jump takeoff and landing during show jumping events.

Topsoil is a very vague term and will vary widely from region to region and even from farm to farm. In general, the properties that make topsoil useful for farming make it much less suitable for use as a surfacing material. In particular, because is a widely graded material, i.e., it includes a wide range of particle sizes and frequently includes a significant percentage of fines, it is very susceptible to compaction. Further, when dry, it can be very hard and/or a significant source of dust and, when wet, can be very sticky and slippery, particularly those topsoil compositions having a large clay component. Topsoils also tend to drain more slowly than the materials discussed above and may require more time and/or treatment after a drenching before they are suitable for use. As noted above, varying combinations of topsoil and sand can provide a satisfactory combination of properties that cannot be easily attained with the individual components.

Stall waste, a combination of manure and plant or wood-based bedding materials, is sometimes used as a surfacing material, particularly in those instances where low cost is the primary decision factor. Unfortunately, stall waste tends to be largely organic and subject to rapid breakdown into small particles that increase the likelihood of compaction. In addition, concerns with regard to pests (flies in particular), dust, odor and sanitation will also be common issues for stall waste applications, particularly those that include large amounts of manure. There are also concerns associated with ammonia released by decomposing urine and manure and its potential for compromising equine respiratory systems, particularly for enclosed applications. Although the outgassing and odor issues may be reduced in outdoor applications, stall waste can still be extremely slippery when wet.

As noted above, a number of surfacing materials are commercially available and touted as addressing one or more of the concerns associated with older, more conventional surfacing materials. These second generation materials, however, have introduced other concerns, particularly with respect to the stability of the materials over wide temperature ranges.

BRIEF SUMMARY

Disclosed are surfacing materials designed to improve upon conventional surfacing materials, particularly those surfacing materials comprising combinations of sand(s), wax(es) and fiber(s). Example embodiments of the surfacing materials comprise suitable base sand that is coated with a polymer or polymer/oil blend and fibers. The disclosed polymers and polymer/oil blends provide significantly less variation in viscosity over normal temperature ranges in which the surfacing material (sometimes referred to as ground cover material) will be utilized, thereby providing a more consistent "going" for the horses being worked on these surfacing materials. Also disclosed are methods of manufacturing such surfacing compositions and methods of using such surfacing compositions in constructing riding venues including, for example, arenas and tracks.

BRIEF DESCRIPTION OF DRAWINGS

Example embodiments described below will be more clearly understood when the detailed description is considered in conjunction with the accompanying drawings, in which:

FIGS. 1 and 2 illustrate example installations of surfacing material compositions according to the disclosure;

Figure 1:
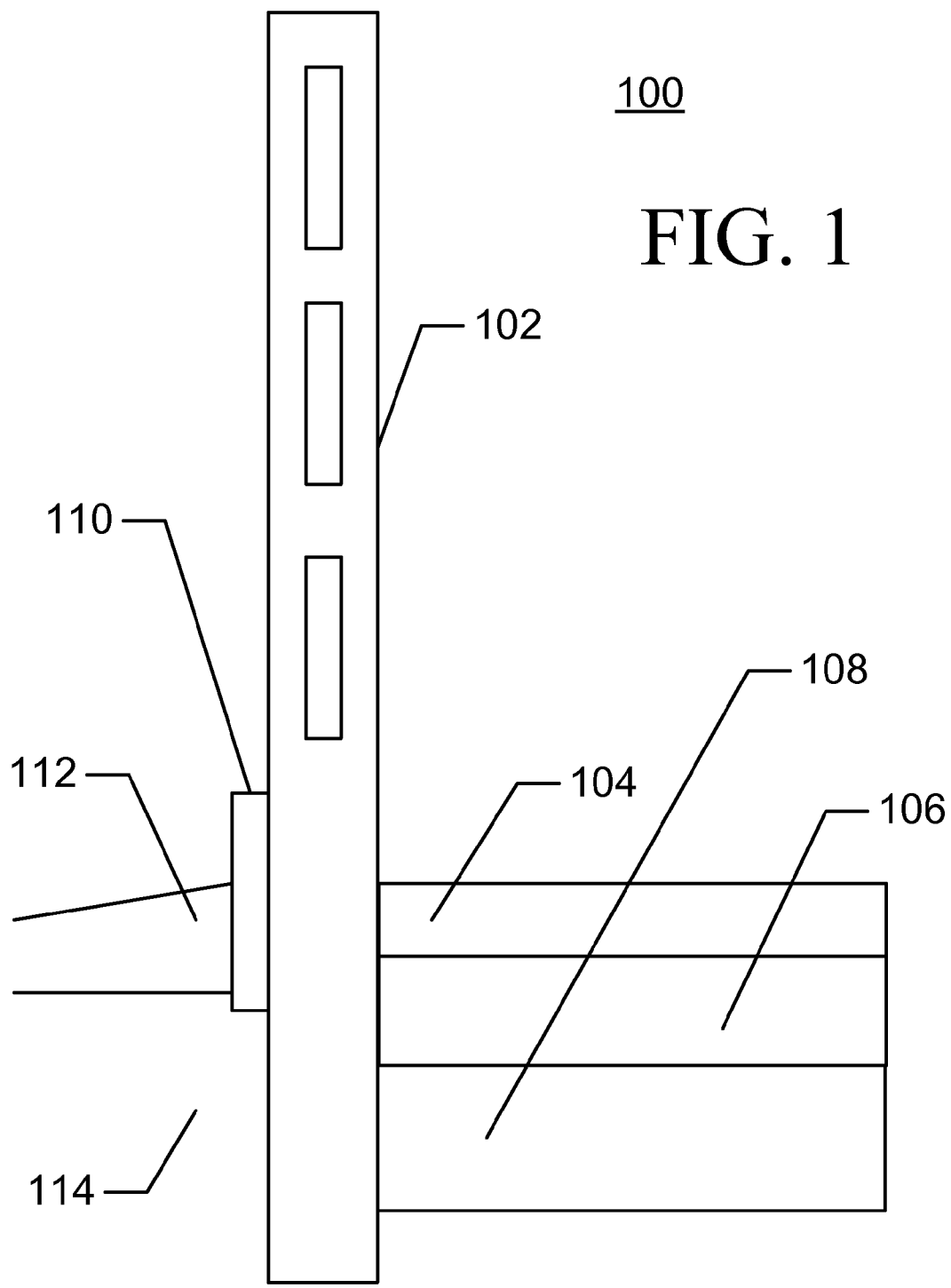

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF EXAMPLE EMBODIMENTS

Surfacing material compositions according to the disclosure include sand, particularly angular or subangular sand, as a primary component of the composition. The sand may comprise between about 80 to about 98% of the total composition. Unless indicated otherwise, the percentages referenced herein refer to weight percentages based on the total weight of the final composition. As noted above, the particle size distribution of the surfacing material will affect its propensity for or resistance to compaction. Particle size analysis of a suitable sand mixture may correspond to the particle distribution reflected below in TABLE 1.

TABLE 1

| Gradation Sieve Size | % Passing |
| --- | --- |
| 4 | 90-100 |
| 8 | 80-100 |
| 16 | 50-90 |
| 30 | 25-80 |
| 50 | 5-30 |
| 100 | 2-10 |
| 200 | ≦5 |

Surfacing material compositions according to the disclosure include at least one polymer and may include a mixture or blend of polymers, copolymers, terpolymers. The polymer component may comprise between about 1 to about 10% of the total composition. It is anticipated that a range of polymeric materials may be used successfully, whether singly or in combination, in the surfacing material compositions including, for example, poly α-olefins, ethylene vinyl acetates (EVA), polyamides, polybutylenes (PB), polystyrenes (PS), polyvinylchlorides (PVC), polyvinylidenechlorides, acrylonitrile butadiene styrenes (ABS). The polymeric material(s) utilized should typically be selected to provide a combination of properties as reflected below in TABLE 2.

TABLE 2

| Property | Test Method | Property Range |
| --- | --- | --- |
| Softening Point | Ring and Ball ASTM D36-06 | 80 to 120° C. |
| Melt Viscosity (190° C.) | ASTM D3236-88 | 2-40 mPa-s |

Surfacing material compositions according to the disclosure may include at least one oil and may include a mixture or blend of oils. The oil component may comprise up to about 10% of the surfacing material composition. It is anticipated that a range of oils may be used successfully, whether singly or in combination, in the surfacing material compositions including, for example, paraffinic oils, aromatic oils and naphthenic oils. The oil(s) utilized should typically be selected to provide a combination of properties as reflected below in TABLE 3.

TABLE 3

| Property | Test Method | Range |
| --- | --- | --- |
| Viscosity | ASTM D445 | 20-100 centistokes at 40° C. |

Surfacing material compositions according to the disclosure also include at least one type of synthetic fiber and may include a mixture or blend of synthetic fibers. The fiber component may comprise between about 0.5 to about 5% of the surfacing material composition. It is anticipated that a range of fibers may be used successfully, whether singly or in combination, in the surfacing material compositions including, for example, rayons, nylons, polyesters, acrylics, polypropylenes (PP) and polyethylenes (PE). Regardless of the composition of the particular fiber(s) used in forming the surfacing material composition, the fibers should typically be selected to provide a combination of properties as reflected below in TABLE 4.

TABLE 4

| Staple Length | Fiber Diameter |
| --- | --- |
| 3.2 mm to 25.4 mm | 0.5 to 12 Denier |

Utilizing a combination of the components identified above, surfacing material compositions according to the disclosure may be manufactured according to the example methods detailed below. In a first example manufacturing method, a quantity of the sand composition is dried and heated to a temperature between about 120 and about 160° C. to prepare the sand for additional processing. A known weight of the prepared sand is then placed in a suitable mixing device including, for example, an asphalt mixing pug mill, a cement mixer or a feed mixer. The corresponding quantities of the polymer and, if utilized, the oil components of the surfacing composition are then added to the sand in the mixing device and then mixed for a period sufficient to distribute the various components generally evenly throughout the sand. Depending on the particular mixture, it is expected that mixing periods of between about 30 seconds and 5 minutes will be sufficient to achieve the desired degree of mixing. The fibers component of the surfacing material composition are then added to the mixture and mixed for a second mixing period sufficient to disperse the fibers throughout the hot mixture.

The hot mixture is removed from the mixer and cooled to near ambient temperature. During the cooling period the mixture is worked in a manner sufficient to suppress blocking of the mixture. One method of working the mixture is to deposit a layer of the hot mixture on the ground to a depth of about 5 to 15 cm and allow the material to air cool. As the layer of the hot mixture cools, it is worked with a harrow or other suitable implement or implements to prevent blocking and thereby retain a generally granular consistency or texture. As will be appreciated, depositing the hot mixture on a prepared base and/or subbase will remove the need to transport the cooled composition and will improve the efficiency of the manufacturing process. Alternatively, larger quantities of the surfacing material composition can be manufactured offsite and then trucked to the final installation.

As illustrated in FIGS. 1 and 2, the material surfacing compositions may be used as the top surfacing material for a range of equestrian applications. For simplicity a simple ring installation is illustrated wherein the surfacing material composition is spread over a prepared base material. Those skilled in the art will appreciate that the base and/or subbase may be configured in various ways and using a range of materials. In general, however, the base and/or subbase materials should be selected to provide a level or gently crowned surface sufficient to support the surfacing material and endure the anticipated uses.

As illustrated in FIG. 2, one or more additional components may be included to provide for improved drainage, moisture control, temperature control and/or physical isolation between adjacent layers depending on the requirements of the particular installation. Particularly in those installations in which supplemental drainage is provided, surfacing materials according to the disclosure may be periodically refreshed by flooding the surface with water to dilute accumulated urine, manure and/or other soluble contaminants and carry the contaminants to the drainage system from which it can be extracted for appropriate treatment and/or disposal.

EXAMPLE 1

A first example surfacing material composition was prepared using the combination of components reflected below in TABLE 5.

TABLE 5

| Ingredient | Percent by Weight |
| --- | --- |
| Sand | 90 |
| Polymer | 5.0 |
| Oil | 3.0 |
| Fiber | 2.0 |

The sand mixture used in preparing Example 1 was a typical ASTM Specification C33 Concrete Sand having a sub-angular particle shape and a gradation distribution as reflected below in TABLE 6.

TABLE 6

| Sieve Size | % Passing |
| --- | --- |
| 3/8 | 100 |
| 4 | 98 |
| 8 | 87 |
| 16 | 70 |
| 30 | 40 |
| 50 | 10 |
| 100 | 3 |
| 200 | 1.7 |

The polymer utilized was a polypropylene, specifically MARLEX™ AGM 110, which was obtained from Phillips Sumika Polypropylene Company, The Woodlands, Tex., USA. The oil was a paraffinic white mineral oil, specifically DRAKEOL™ 350, which was obtained from Penreco, Dickinson, Tex., USA. The fiber utilized was polypropylene, 2 Denier, with a staple length of about 1.3 cm (about 0.5 inch) which was obtained from Barnet, Arcadia, S.C., USA.

As suggested above, the sand was prepared by heating in an asphalt dryer drum to achieve a sand temperature of between about 140 and about 160° C. and a moisture content of less than 0.2% by weight. 4000 pounds (1814 kg) of the heated sand mixture was batched into an asphalt pug mill mixing device. 200 pounds (90.7 kg) of the MARLEX™ polymer and 120 pounds (54.4 kg) of the DRAKEOL™ oil were then added to the sand mixture in the mixer. The ingredients were mixed for 120 seconds, after which 80 pounds (36.3 kg) of the fiber was added to the mixer. The final composition was then mixed for an additional 60 seconds.

The mixed product was then removed from the mixer and transported to the installation site where it was laid onto ground to form a layer having a substantially uniform depth of about 13 cm. The cooling layer of the mixed product was repeatedly harrowed as it cooled with an 8 foot (2.4 m), red master harrow obtained form CB&H Fabrication, Amarillo, Tex., USA, until the mixed product reached a temperature near the ambient air temperature, in this case less than about 30° C. The resulting surfacing composition had generally consistent granular texture throughout the depth of the layer. The basic manufacturing process is illustrated in FIG. 3.

EXAMPLE 2

A second example surfacing material composition was prepared using the combination of components reflected below in TABLE 7.

TABLE 7

| Ingredient | Percent by Weight |
|---|---|
| Sand | 93.5 |
| Polymer | 3.0 |
| Oil | 1.5 |
| Fiber | 2.0 |

The sand mixture used in preparing Example 2 was a typical ASTM Specification C33 Concrete Sand having a sub-angular particle shape and a gradation distribution as reflected above in TABLE 6.

The polymer utilized was a poly α-olefin, specifically VESTOPLAST™ 408, which was obtained from Evonik Degussa Corporation, 379 Interpace Parkway, Parsippany, N.J., USA. The oil was a paraffinic white mineral oil, specifically DRAKEOL™ 21, which was obtained from Penreco, Dickinson, Tex., USA. The fiber was the polypropylene fiber used in Example 1.

The sand was prepared by heating in an asphalt dryer drum to achieve a sand temperature of between about 120 and about 130° C. with a moisture content of less than 0.2% by weight. 4000 pounds of the heated sand was batched into an asphalt pug mill mixing device. 120 pounds of the VESTOPLAST™ polymer was then added directly into the mixer as 60 pounds of the DRAKEOL™ oil was pumped into the mixer. The ingredients a mixed for 120 seconds after which 80 pounds of the fiber was added and mixed for an additional 60 seconds.

The mixed product was then removed from the mixer, transported to the installation site and deposited on the ground as a layer having a generally uniform depth of about 13 cm. The cooling layer of the mixed product was repeatedly harrowed as it cooled with an 8 foot (2.4 m), red master harrow obtained form CB&H Fabrication, Amarillo, Tex., USA, until the mixed product reached a temperature near the ambient air temperature, in this case less than about 30° C. The resulting surfacing composition had generally consistent granular texture throughout the depth of the layer.

EXAMPLE 3

A first example surfacing material composition was prepared using the combination of components reflected below in TABLE 8.

TABLE 8

| Ingredient | Percent by Weight |
|---|---|
| Sand | 94.0 |
| Polymer | 4.0 |
| Fiber | 2.0 |

The sand mixture used in preparing Example 3 was a typical ASTM Specification C33 Concrete Sand having a sub-angular particle shape and a gradation distribution as reflected above in TABLE 6. The polymer utilized was an amorphous poly α-olefin (APAO), specifically Vestoplast 508, which was obtained from Evonik Degussa Corporation, 379 Interpace Parkway, PO Box 677, Parsippany, N.J. 07054. The fiber utilized was polyester, 2 Denier, with a staple length of about 0.6 cm (about ¼ inch) which was obtained from William Barnet & Son, 1300 Hayne Street, Arcadia, S.C. 29320.

As in the examples detailed above, the sand was prepared by heating in an asphalt dryer drum to achieve a sand temperature of between 120 and 150° C. and a moisture content of less than 0.2% by weight. 4000 pounds (1814 kg) of the heated sand mixture was batched into an asphalt pug mill mixing device and 160 pounds (72.6 kg) of the Vestoplast 508 polymer were then added to the mixer. The ingredients were then mixed for approximately 60 seconds, after which 80 pounds (36.3 kg) of the fiber was added to the mixture. The final composition was mixed for an additional 60 seconds.

The mixed product was then removed from the mixer and transported to the installation site where it was laid onto the ground to form a layer having a substantially uniform depth of about 13 cm. The cooling layer of the mixed product was repeatedly harrowed as it cooled with an 8 foot (2.4 m) Red Master Harrow obtained from CB&H Fabrication, Amarillo, Tex., USA, until the mixed product reached a temperature near the ambient air temperature, in this case less than about 30° C., to form the surfacing material. The resulting material had generally consistent granular texture throughout the depth of the layer. The resulting surfacing composition had generally consistent granular texture throughout the depth of the layer. The basic manufacturing process is illustrated in FIG. 3B.

As illustrated in the example embodiment 100 of FIG. 1, the surfacing maybe used to form the working surface of an arena or other enclosure bounded by a fence 102 or other barrier suitable for containing livestock. A layer of the surfacing material 104 may be formed on a prepared base layer 106 that is, in turn, formed on a prepared sub-base layer 108. Boards or other structures may be used to form a barrier 110 at the perimeter of the arena to help confine the surfacing material. Outside the arena, a layer 112 of, for example, mulch, grass, gravel or sand may be provided on the native soil 114 to improve appearance and/or function. As illustrated in the example embodiment 200 of FIG. 2, the basic structure of the arena of FIG. 1 may be improved through the provision of one or more additional structures including, for example, suitable geotextiles 116, irrigation lines 120, drainage lines 118 and heating/cooling elements 122 such as heating tapes and/or steam/chilled water lines. As will be appreciated by those skilled in the art, the selection and configuration of such additional structures will be determined in large part by the location and intended use of the area to which the surfacing material will be applied and the budget for such an application.

Figure 3A:
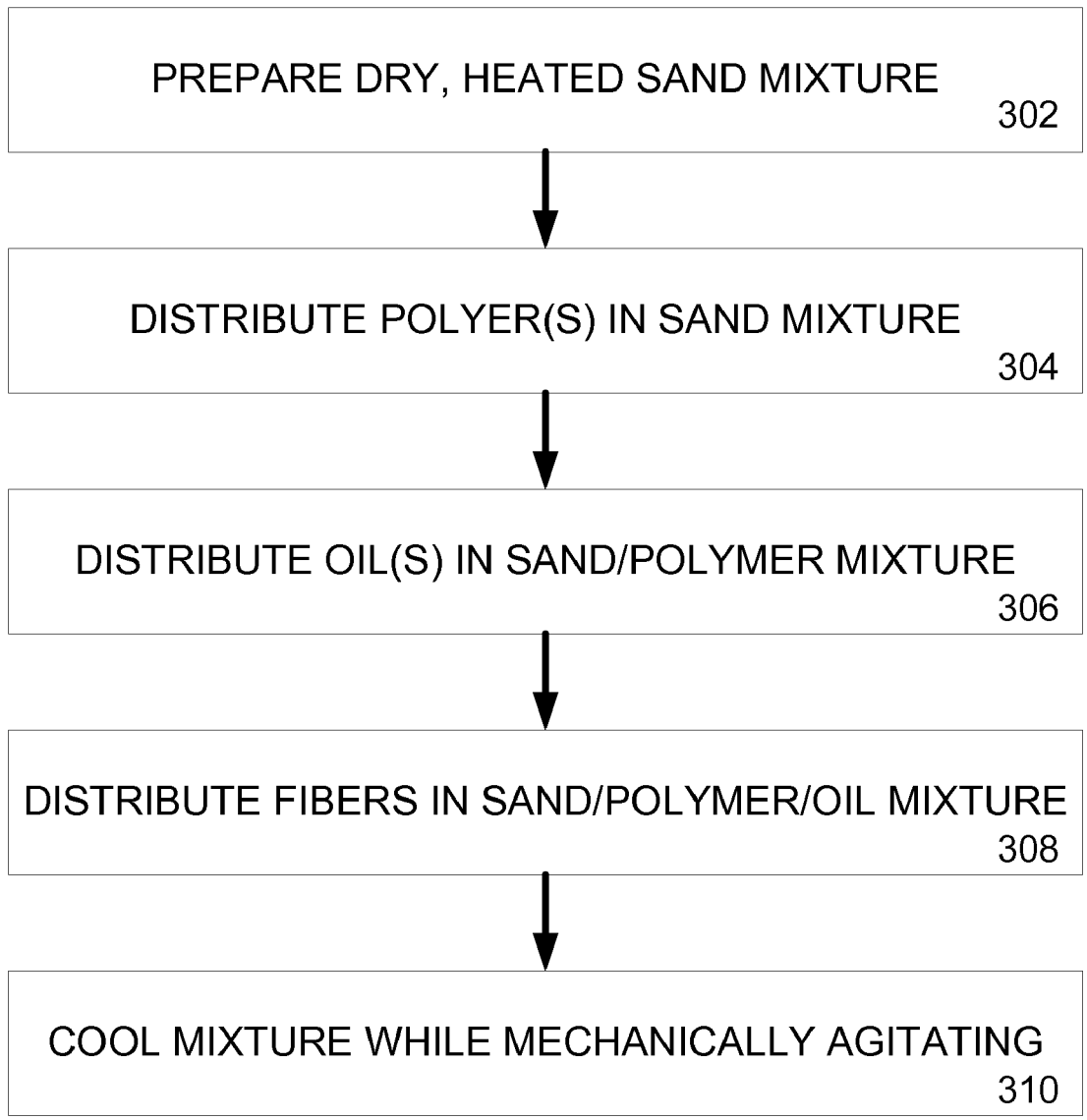
FIGS. 3A and 3B illustrate example embodiments of methods of manufacturing surface material compositions according to the disclosure.
Figure 3B:
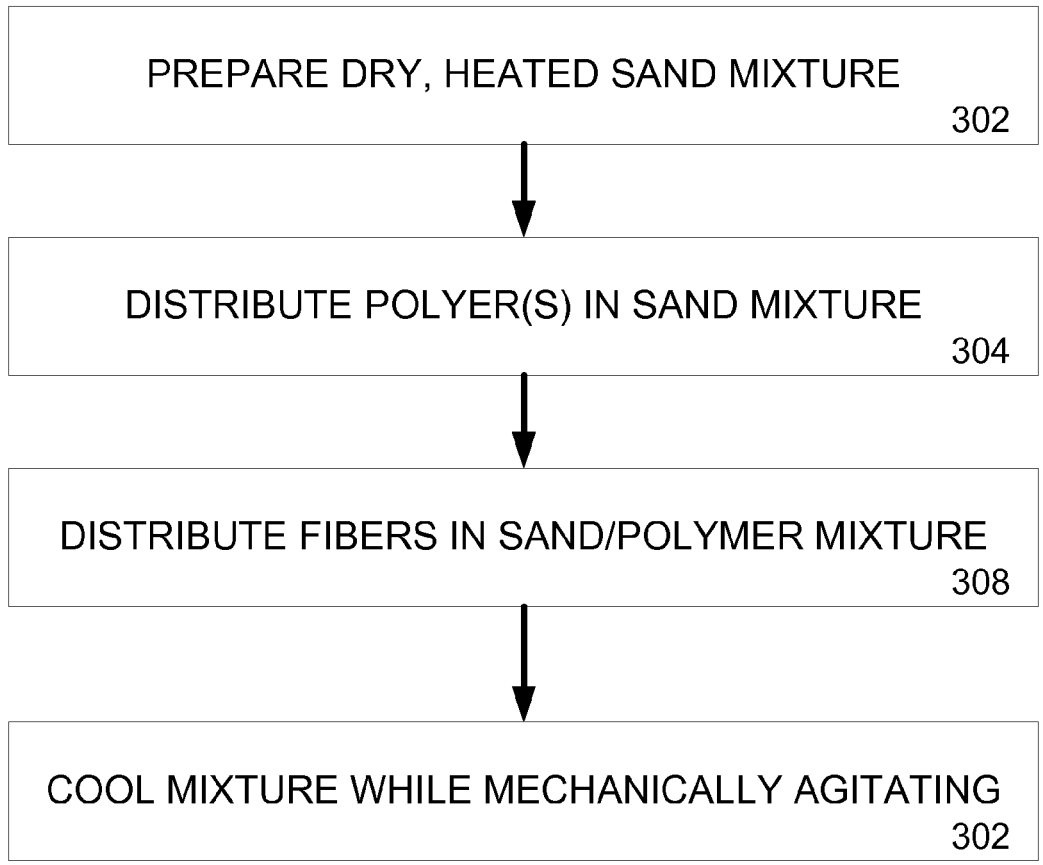

As illustrated in the example embodiment of FIG. 3A, surfacing compositions may be manufactured by heating a dry, cleaned sand mixture 302 and adding a polymer component 304, an oil component 306 and a fiber component 308, typically within a heated and agitated mixer. Once the various components are well mixed, the mixture will be cooled to a temperature within the intended operating range, for example within 20° C. of the ambient temperature at the installation site while maintaining a degree of agitation sufficient to reduce agglomeration. The hot mixture may be discharged from the mixer on site or, more typically, into a suitable transport for delivery to the installation site. Another example embodiment is illustrated in FIG. 3B in which the addition of the oil component is omitted. As will be appreciated by those skilled in the art, the addition steps 304, 306 (if performed) and 308 may be performed in a different order or may be completed substantially simultaneously.

Figure 4A:
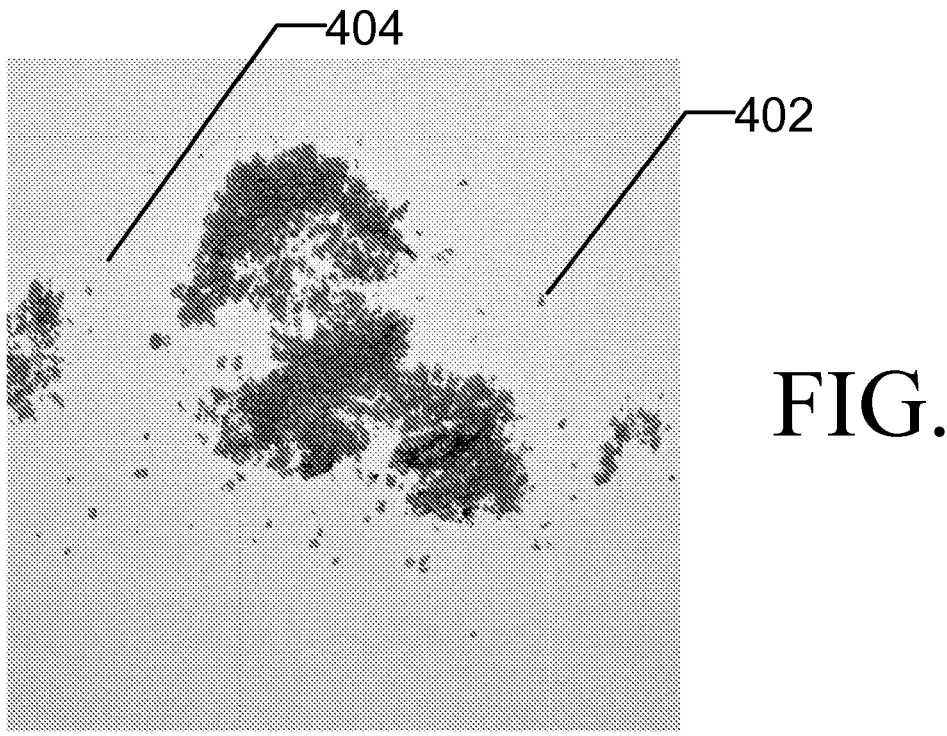
FIGS. 4A-6B illustrate example embodiments of surfacing material compositions according to the disclosure with FIGS. 4A, 5A and 6A illustrating a small distributed sample and FIGS. 4B, 5B and 6B illustrating a bulk sample, e.g., having a thickness of at least 1 cm.
Figure 4B:
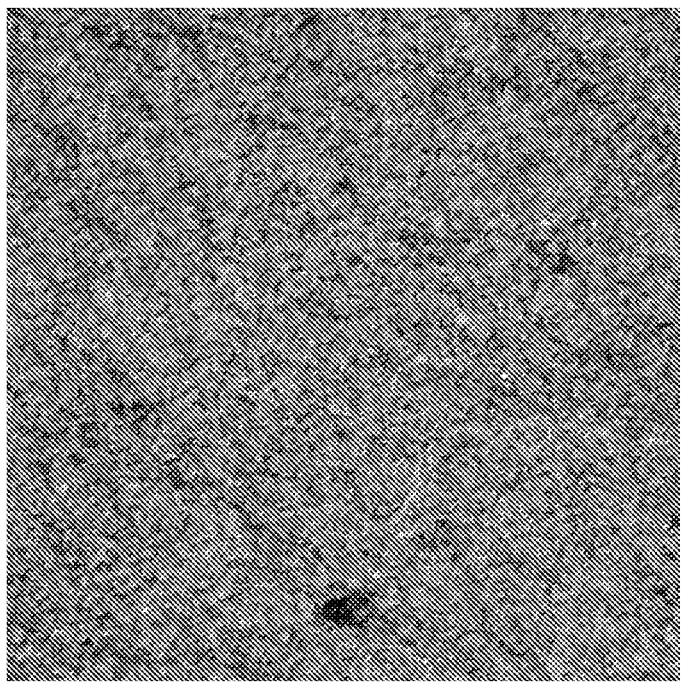
Figure 5A:
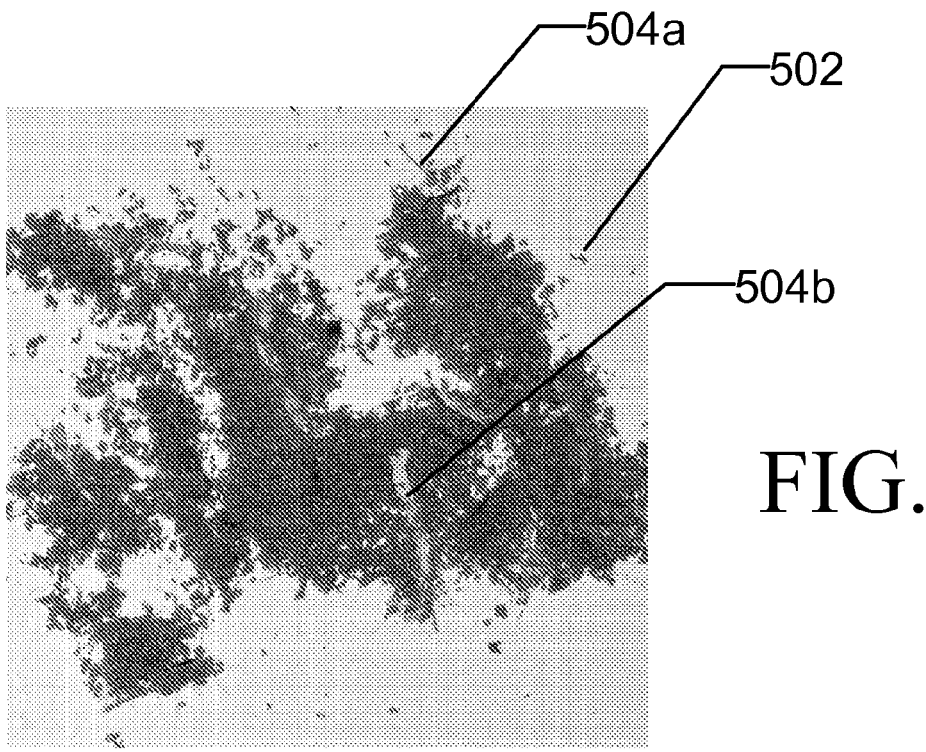
Figure 5B:
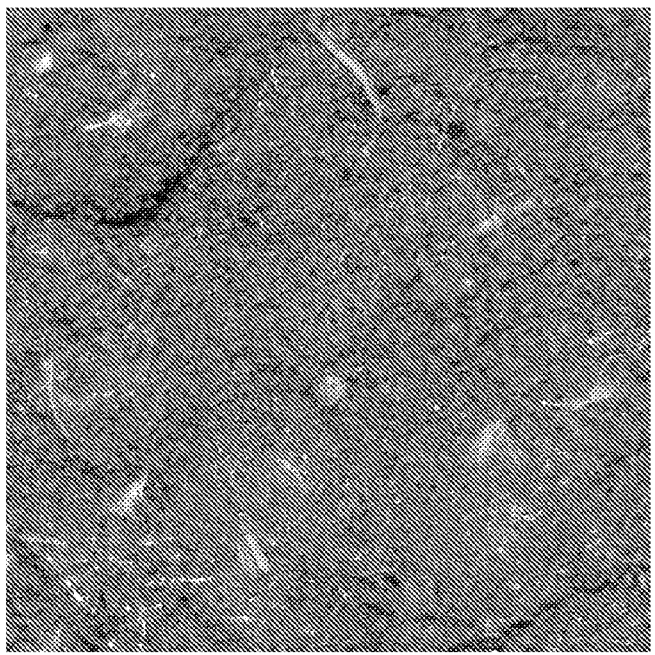
Figure 6A:
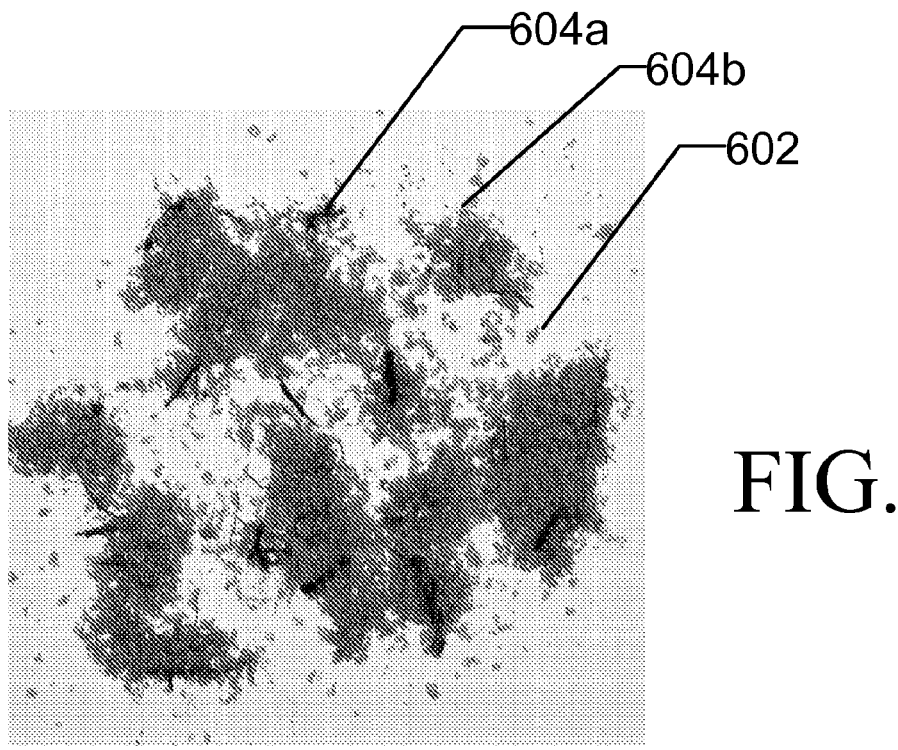
Figure 6B:
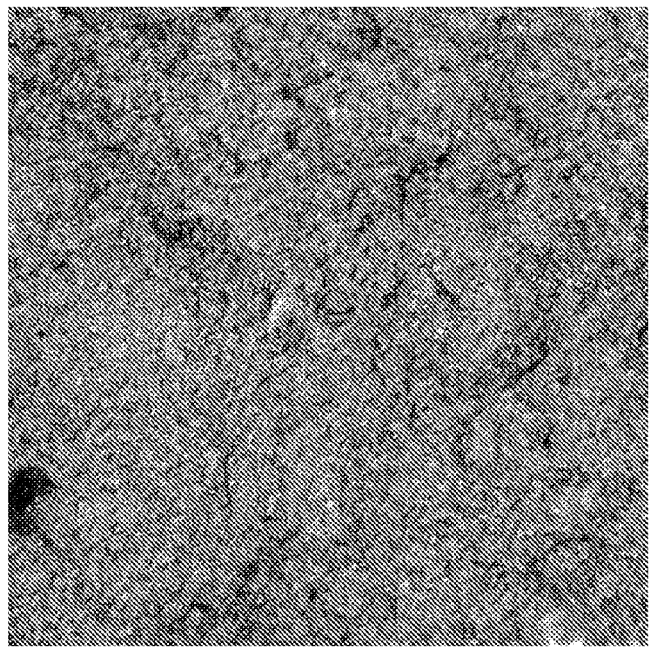

As illustrated in FIGS. 4A and 4B, a first example embodiment of a surfacing composition includes coated sand particles 402 and fibers 404. As illustrated in FIGS. 5A and 5B, a second example embodiment of a surfacing composition includes coated sand particles 502 and varied fibers 504a and 504b. As illustrated in FIGS. 6A and 6B, a third example embodiment of a surfacing composition includes coated sand particles 602 and varied fibers 602a and 602b.

Those skilled in the art will also appreciate that the surfacing compositions disclosed herein may be further modified for particular applications by taking into consideration such factors as the anticipated temperature range, the depth of the surfacing composition and the moisture control available.

While the invention has been particularly shown and described with reference to certain example embodiments thereof, it will be understood by those of ordinary skill in the art that various changes in form and details may be made therein without departing from the spirit and scope of the invention as defined by the following claims.

We claim:
1. A surfacing composition comprising:
from 80 to 98 wt % cleaned sand;
from 1 to 10 wt % of a polymer component; from 0.1 to 10 wt % of an oil component; and from 0.5 to 5 wt % of a fiber component that exhibits an average staple length of 3.2 to 25.4 mm and an average fiber diameter of 0.5 to 12 Denier.

2. The surfacing composition according to claim 1, wherein:
the cleaned sand includes a major portion of grains classified as angular or sub-angular.

3. The surfacing composition according to claim 1, wherein:
the polymer component includes at least one polymer selected from a group consisting of polymers, copolymers, terpolymers and mixtures and combinations thereof.

4. The surfacing composition according to claim 1, wherein:
the polymer component includes at least one polymer selected from a group consisting of poly α-olefins, ethylene vinyl acetates (EVA), polyamides, polybutylenes (PB), polystyrenes (PS), polyvinylchlorides (PVC), polyvinylidenechlorides, acrylonitrile butadiene styrenes (ABS) and mixtures and combinations thereof.

5. The surfacing composition according to claim 1, wherein:
the polymer component exhibits both a softening point of 80 to 120° C. as measured according to ASTM D36-06 and a melt viscosity at 190° C. of 2 to 40 mPa-s as measured according to ASTM D3236-88.

6. The surfacing composition according to claim 1, wherein:
the oil component exhibits a viscosity at 40° C. of 20 to 100 centistokes as measured according to ASTM D445.

7. The surfacing composition according to claim 6, wherein:
the oil component is selected from a group consisting of paraffinic oils, aromatic oils, naphthenic oils and mixtures and combinations thereof.

8. The surfacing composition according to claim 1, wherein:
the fiber component is selected from a group of synthetic fibers consisting of rayons, nylons, polyesters, acrylics, polypropylenes, polyethylenes and combinations and mixtures thereof.

9. The surfacing composition according to claim 1, wherein:
the polymer component exhibits both a softening point of 80 to 120° C. as measured according to ASTM D36-06 and a melt viscosity at 190° C. of 2 to 40 mPa-s as measured according to ASTM D3236-88;
and the oil component exhibits a viscosity at 40° C. of 20 to 100 centistokes as measured according to ASTM D445.

10. The surfacing composition according to claim 1, further comprising:
from 89.5 to 94.5 wt % cleaned sand;
from 2.5 to 5.5 wt % of a polymer component;
from 0.1 to 3.5 wt % of an oil component; and
from 0.5 to 2.5 wt % of a fiber component.

11. A surfacing composition comprising:
from 93.5 to 94.5 wt % cleaned sand;
from 3.5 to 4.5 wt % of a polymer component; less than 0.1 wt % of an oil component; and from 0.5 to 2.5 wt % of a fiber component that exhibits an average staple length of 3.2 to 25.4 mm and an average fiber diameter of 0.5 to 12 Denier.

12. The surfacing composition according to claim 11, wherein:
the composition is substantially free of an oil component.

13. A surfacing composition consisting essentially of:
from 90 to 94 wt % cleaned sand; from 2.5 to 5.5 wt % of a polymer component that exhibits both a softening point of 80 to 120° C. as measured according to ASTM D36-06 and a melt viscosity at 190° C. of 2 to 40 mPa-s as measured according to ASTM D3236-88; and
from 0.5 to 2.5 wt % of a fiber component that exhibits an average staple length of 3.2 to 25.4 mm and an average fiber diameter of 0.5 to 12 Denier.

* * * * *